Aug. 1, 1944. H. C. HALL 2,354,750
ELECTRIC SWITCH
Filed June 6, 1942
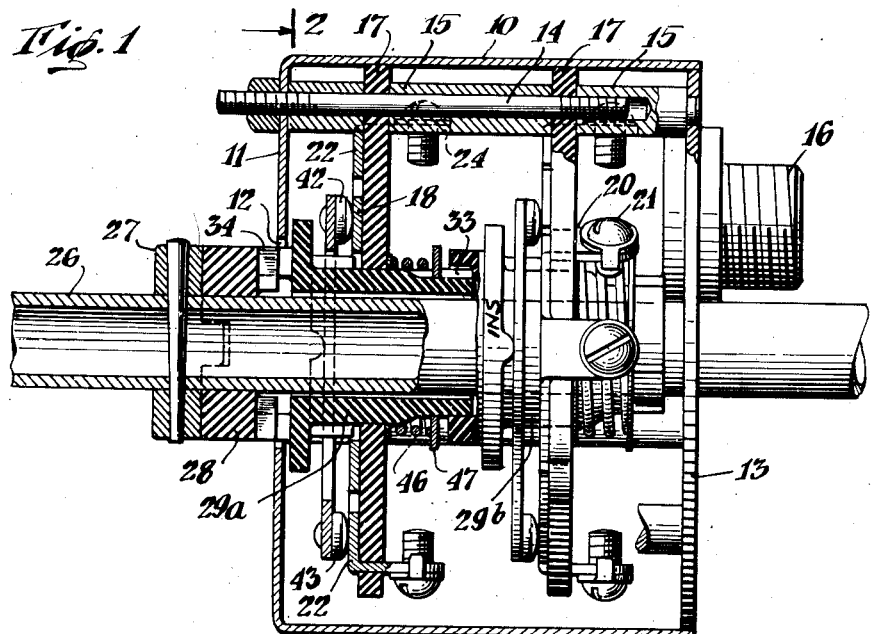
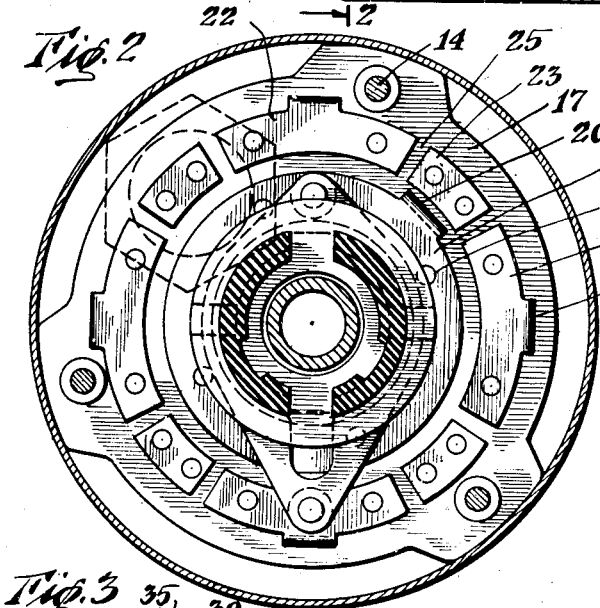
INVENTOR.
Harry C. Hall
BY Robbin + Carlson
ATTORNEYS Patented Aug. 1, 1944

2,354,750

UNITED STATES PATENT OFFICE 2,354,750

ELECTRIC SWITCH

Harry C. Hall, Indianapolis, Ind., assignor to P. R. Mallory & Co., Inc., Indianapolis, Ind., a corporation of Delaware Application June 6, 1942, Serial No. 446,088

9 Claims. (Cl. 200—6)

This invention relates to rotary electric switches.

An object of the invention is to improve electric switches and their method of manufacture and assembly.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a longitudinal section through an electric switch embodying features of the present invention;

Figure 2 is a section on the line 2—2 of Figure 1;

Figure 3 is a perspective view of a rotor element; and

Figure 4 is a plan view of a rotor contact spring used in the switch.

One feature of the invention resides in the use of interfitting rotor elements which can be fitted together end to end to produce a switch rotor having as many switch sections as desired. Another feature of the invention resides in the method of mounting the contact spring on said rotor elements. A further feature comprises the means for mounting a compression spring for applying pressure to the contacts. Other features of the invention will be apparent from the following detailed description.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing, the switch in its preferred form comprises a cylindrical metal cover 10 having an end wall 11 provided with a central aperture 12 through which the rotor control shaft passes. A second end wall 13 closes the other end of the cover and is secured to and spaced from end wall 11 by three uniformly spaced mounting studs 14 having spacing sleeves 15 carried thereon.

End wall 13 has a central opening to accommodate the rotor shaft and a second opening provided with a conduit coupling 16 for carrying the necessary connecting wires into the switch.

A plurality of parallel stator plates 17 of sheet insulating material are mounted within the switch cover on studs 14, spaced by spacing sleeves 15. Two stator plates 17 are illustrated in the figures although it will be apparent that a switch can be made containing any desired number of spaced stator plates. Stator plates 17 in the region of studs 14 are made of such diameter as to fit within cover 10 with a slight clearance. The plates are cut away to smaller diameter, however, between studs 14 to provide spaces between the edge of the stators and cover 10 through which the connecting wiring for other stators of the switch may pass.

Each stator plate carries a circular flat contact ring 18 secured against one of its faces by rivets 19 and having a terminal lug 20 bent down from one edge thereof and passing through a suitable slot in the stator and projecting upward from the opposite side of the stator where it may readily be attached to the connecting wiring by screw 21.

Also mounted against the same face of stator 17, spaced outside of circular contact 18 and concentric with it is a series of arcuate contact segments 22 and spacing segments 23. Segments 22 are each provided with a terminal lug bent at right angles to the segment and passing through a suitable slot in the stator 17 to provide a wire connecting terminal on the other side of the stator. Spacing segments 23 which alternate with segments 22 on the stator have no connecting lugs and merely provide bearing surfaces for the rotor contact to slide over in passing from one contact segment 22 to the next contact segment 22. Short gaps or spaces 25 are provided between the ends of segments 22 and 23 to insure that they will be insulated from each other. Therefore, the rotor contact is temporarily isolated from the switch circuits while it is on a segment 23. This insures that no two contact segments 22 will be conductively "shorted" by the rotor contact at any time during the operation of the switch.

The rotor is driven by a central drive shaft 26 passing completely through the switch to which is keyed a metal drive ring 27 coupled to the rotor by Bakelite coupling ring 28. The rotor comprises a plurality of similar sections corresponding in number to the number of stator plates. Hence, in the switch illustrated two rotor sections are provided. Each rotor section comprises a rotor element 29, such as is illustrated in Figure 3, formed of insulating material, such as Bakelite, ceramic or other suitable insulating material.

Rotor element 29 has a central bore 30 for accommodating the control shaft and a notched coupling flange 31 at one end thereof, the notches 32 of which interfit with similarly shaped driving lugs 33 on the end of a preceding rotor section. In the case of the first rotor section, identified as 29a in Figure 1, notches 32 cooperate with driving lugs 34 on coupling ring 28. In the case of rotor 29b of Figure 1, it is driven by lugs 33 of rotor 29a.

An annular flange 35 is an integral part of rotor 29 adjacent to notched flange 31 and a cylindrical portion 36 is provided between flange 35 and the end of the rotor carrying lugs 33. The surface of cylindrical portion 36 is flush with the outer edges of lugs 33, the rotor being cut away to a smaller diameter in the end region 37 to leave lugs 33.

Flange 35 is provided on its rear face with a pair of diametrically opposed rounded ridges 38 and a pair of rectangular positioning lugs 39 located 90° from ridges 38.

Rotor contact 40 comprises a sheet metal yoke member having a central circular aperture 41 of such diameter as to fit loosely over cylindrical portion 36 of rotor 29. This contact member is extended at diametrically opposite edges to tapered rounded arms carrying contact discs 42 and 43, respectively, against the face of the rotor member at distances from the axis corresponding to the distances of stator contacts 18 and 22, respectively. The rotor contact member has opposed notches 44 and 45 cut in the edge of inner circular aperture 41 at positions in line with contacts 42 and 43, respectively. When the rotor is assembled, rotor contact member 40 embraces cylindrical portion 36 of the rotor with notches 44 and 45 engaging lugs 39 of the rotor so that contact spring 40 will be turned with the rotor. Rotor 40 rests against diametrically opposed ridges 38 of the rotor so as to be tiltable about these ridges as an axis. When the switch is assembled, contacts 42 and 43 bear against the surfaces of contacts 18 and 22, respectively, under the pressure applied by ridges 38 to the member 40.

Each rotor 29 extends through a central accommodating opening in its stator 17 and is held in position by a coil compression spring 46 encircling the rotor and pressing against the stator plate 17 on the one hand and a pressure ring 47 on the other hand fitted in notches 48 cut in lugs 33 of the rotor. Thus, coil spring 46 supplies the necessary spring pressure to the contacts. Ring 47 has notches on its inner periphery to enable it to be placed over the end of the rotor after which it is rotated about 60 degrees to lock it in place.

With the construction described a switch of any desired number of sections can be readily and rapidly assembled which is of sturdy fool-proof construction and produced from interchangeable parts. In operation rotor contact member 40 connects contact ring 18 with a contact 22 selected by turning the rotor.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electric switch comprising at least one stator plate, stator contacts on one face thereof, a cylindrical insulating rotor element passing through an aperture in said plate, rotor contacts thereon bearing against said stator contacts, and a shoulder on said rotor on the opposite side of said stator plate from said contacts and a compression spring interposed between said shoulder and said stator plate.

2. An electric switch comprising at least one stator plate, stator contacts on one face thereof, a cylindrical insulating rotor element passing through an aperture in said plate, rotor contacts thereon bearing against said stator contacts, and a shoulder on said rotor on the opposite side of said stator plate from said contacts and spaced from said plate, and a coil compression spring encircling said rotor and bearing against said shoulder and said stator plate.

3. An electric switch comprising a plurality of spaced parallel stator plates, stator contacts on a face of each of said plates, a rotor passing through aligned apertures in said plates, said rotor comprising a series of interfitting rotor elements each of which is disposed in the aperture of one of said stator plates, rotor contacts on said rotors and bearing against the stator contacts of their respective stators, said rotors having interfitting driving coupling formations on their ends, whereby they are adapted to rotate as a unit.

4. An electric switch comprising a plurality of spaced parallel stator plates, stator contacts on a face of each of said plates, a rotor passing through aligned apertures in said plates, said rotor comprising a series of interfitting rotor elements each of which is disposed in the aperture of one of said stator plates, rotor contacts on said rotors and bearing against the stator contacts of their respective stators, said rotors having interfitting driving coupling formations on their ends, whereby they are adapted to rotate as a unit and springs individual to each of said rotors urging the contacts of said rotor against the contacts of its respective stator.

5. An electric switch comprising at least one stator plate, stator contacts on one face thereof, a cylindrical insulating rotor passing through an aperture in said plate, a rotor contact member comprising a yoke loosely embracing said rotor and bearing against said stator at diametrically opposite points thereon, said rotor contact yoke member carrying a contact at at least one of said bearing points cooperating with said stator contacts, diametrically opposite shoulders on said rotor disposed transverse of a line connecting said bearing points and a spring urging said rotor axially in a direction to press said shoulders against said yoke and thereby press said rotor contact yoke member toward said stator.

6. An electric switch comprising at least one stator plate, two concentric rings of stator contacts against one face of said plate, a cylindrical insulating rotor passing through an aperture in said plate, a rotor contact member comprising a sheet metal yoke loosely embracing said rotor and carrying contacts at diametrically opposite edges thereof at radii corresponding respectively to the radii of said rings of stator contacts and bearing against said stator contacts, respectively, diametrically opposite shoulders on said rotor disposed transverse to a line joining said rotor contacts, said yoke being disposed between said shoulders and said stator, and a spring urging said rotor axially to press said shoulders against the sides of said yoke and thereby apply pressure to said cooperating rotor and stator contacts.

7. An electric switch comprising at least one stator plate, two concentric rings of stator contacts against one face of said plate, a cylindrical insulating rotor passing through an aperture in said plate, a rotor contact member comprising a sheet metal yoke loosely embracing said rotor and carrying contacts at diametrically opposite edges thereof at radii corresponding respectively to the radii of said rings of stator contacts and bearing against said stator contacts, respectively, diametrically opposite shoulders on said rotor disposed transverse to a line joining said rotor contacts, said yoke being disposed between said shoulders and said stator, a shoulder on said rotor on the opposite side of said stator from said contacts and a compression spring interposed between said last-mentioned shoulder and said stator.

8. An electric switch comprising a plurality of spaced parallel stator plates, a rotor passing through aligned apertures in said plates, said rotor comprising a series of interfitting cylindrical insulating rotor elements each of which is disposed in the aperture of one of said stator plates, said rotor elements being coupled by interfitting driving coupling formations on their adjoining ends, whereby they are adapted to rotate as a unit, each of said stator plates having two concentric rings of stator contacts against one face thereof, its respective rotor element carrying a contact member comprising a sheet metal yoke loosely embracing said rotor element and carrying contacts at diametrically opposite edges thereof at radii corresponding respectively to the radii of said rings of stator contacts and bearing against said stator contacts, respectively, diametrically opposite shoulders on said rotor element disposed transverse to a line joining said rotor contacts, said yoke being disposed between said shoulders and said stator, and a spring urging said rotor axially to press said shoulders against the sides of said yoke and thereby apply pressure to said cooperating rotor and stator contacts.

9. An electric switch comprising a plurality of spaced parallel stator plates, a rotor passing through aligned apertures in said plates, said rotor comprising a series of interfitting cylindrical insulating rotor elements each of which is disposed in the aperture of one of said stator plates, said rotor elements being coupled by interfitting driving coupling formations on their adjoining ends, whereby they are adapted to rotate as a unit, each of said stator plates having two concentric rings of stator contacts against one face thereof, its respective rotor element carrying a contact member comprising a sheet metal yoke loosely embracing said rotor element and carrying contacts at diametrically opposite edges thereof at radii corresponding respectively to the radii of said rings of stator contacts and bearing against said stator contacts, respectively, diametrically opposite shoulders on said rotor element disposed transverse to a line joining said rotor contacts, said yoke being disposed between said shoulders and said stator, a shoulder on said rotor element on the opposite side of said stator from said contacts and a compression spring interposed between said last-mentioned shoulder and said stator.

HARRY C. HALL.